United States Patent [19]

Holmes

[11] Patent Number: 5,287,407
[45] Date of Patent: Feb. 15, 1994

[54] COMPUTER SOFTWARE PROTECTION

[75] Inventor: Keith Holmes, Dublin, Ireland

[73] Assignee: International Business Machines Corporation, Armonk, N.Y.

[21] Appl. No.: 704,757

[22] Filed: May 23, 1991

[30] Foreign Application Priority Data

May 31, 1990 [EP] European Pat. Off. ........ 90305964.0

[51] Int. Cl.$^5$ .............................................. H04L 9/00
[52] U.S. Cl. ........................................................ 380/4
[58] Field of Search ........................................... 380/4

[56] References Cited

U.S. PATENT DOCUMENTS

| | | | |
|---|---|---|---|
| 4,748,562 | 5/1988 | Brown | 364/ |
| 4,866,769 | 9/1989 | Karp | 380/4 |
| 4,903,296 | 2/1990 | Chandra et al. | 380/4 |
| 4,979,210 | 12/1990 | Nagata et al. | 380/4 |
| 5,027,396 | 6/1991 | Platteter et al. | 380/4 |
| 5,027,398 | 6/1991 | Miyoshi | 380/4 |

FOREIGN PATENT DOCUMENTS

| | | |
|---|---|---|
| 302710 | 2/1989 | European Pat. Off. . |
| 2541014 | 8/1984 | France . |
| 8201273 | 4/1982 | PCT Int'l Appl. . |
| 8502310 | 5/1985 | PCT Int'l Appl. . |
| 2154769 | 9/1985 | United Kingdom . |

OTHER PUBLICATIONS

IBM Technical Disclosure Bulletin, vol. 28, No. 2 Jul. 1985 "Computer Program Identification".

*Primary Examiner*—David Cain
*Attorney, Agent, or Firm*—Lauren C. Bruzzone; Jesse L. Abzug

[57] ABSTRACT

A master copy of a software file has within it a predetermined block of data. When a copy of the file is made that block of data within the copied file is located and overwritten with data identifying the copied file. When an unauthorized copy is found, the data identifying the copy can be read and the source of the unauthorized copy may be traced. The invention is particularly suited to use with software distribution over a computer network in which details such as the time the copied file was made and the name of the authorized user can be embedded within the copy.

13 Claims, 1 Drawing Sheet

COMPUTER SOFTWARE PROTECTION

BACKGROUND OF THE INVENTION

1. Field of the Invention

This invention relates to the field of computer software protection. More particularly, this invention relates to combating the making of unauthorized copies of software.

2. Background Information

Computer software, whether in the form of computer programs or data files, is a valuable asset. Much expense is involved in the production of such software, and yet, software is particularly vulnerable to theft. It is possible to make a copy of a piece of computer software in a matter of seconds using standard computer equipment and an appropriate medium such as a blank floppy disk. Once a copy is made the original is completely intact, and the unauthorized copy may be used by the thief without any payment to the software owner.

A large number of techniques have been proposed to combat the making of such unauthorized copies. Typically, these techniques concentrate on the prevention of the production of working copies of the software, e.g. by encryption, passwords or physical devices needed to enable use of the software. Examples of such techniques are described in British Published Patent Application No. 2154769, European Published Patent Application No. 302710, European Published Patent Application No. 67998 and International Published Patent Application No. WO 85/02310. Such techniques result in increased complexity, and while offering a degree of protection are, as with most forms of security, open to defeat by appropriate countermeasures. New security measures, particularly ones that can be simply and cheaply implemented, are desirable in trying to counteract unauthorized copying.

OBJECTS OF THE INVENTION

It is the object of this invention to provide a method for easily identifying unauthorized copies of data files.

It is a further object of this invention to provide a method for identifying the source of unauthorized copies of data files.

SUMMARY OF THE INVENTION

These objects, and other advantages to be described, are accomplished by the present invention, which provides a method of producing a copy of a file from a master file in a data processing system. The invention is characterized by searching to locate a predetermined block of data within said copied file, and overwriting said predetermined block of data with data identifying the copied file. The invention also provides a technique whereby each copy of the file produced has data within it identifying that copy. If that copy is itself copied, then the identifying information will be carried over into the unauthorized copy. If an unauthorized copy is discovered, then the source of the unauthorized copy may be identified.

The way in which this identifying information is inserted in the copy, and subsequently revealed, is particularly easy to implement within standard computer hardware. There is no need for special purpose devices which bring with them increased complexity and expense. The data identifying the copied file may be written into the copied file with the same hardware that is duplicating the rest of the master file. Furthermore, since the predetermined block of data may be positioned anywhere within the master and copied files, it is difficult for an unauthorized copier to identify and remove the data identifying the copied file.

Another advantage of the system is that a software file may be produced by a software vendor to include the predetermined block of data, but use of that file will not require use of the technique of the invention. Accordingly, the same software file can be used in systems which do or do not implement the invention. The particular combination of elements comprising the invention provides a security technique which is surprisingly simple to implement and effective in use.

It will be seen that the invention is applicable wherever copies of software files are being produced, e.g. a single computer copying files onto floppy disks for distribution and sale. However, the invention is particularly applicable when a master file is stored on a first data processing system and a copied file is transmitted to a second data processing system. Such computer networks are becoming ever more common and bring with them a convenient way of distributing and maintaining software files. The invention is particularly suited for use in such networks since it is a relatively simple matter to add to the system the extra steps necessary to ensure that every copy of a software file distributed by the system may subsequently be uniquely identified. The data identifying the copied file could be added either before or after transmission. Furthermore, producers of software files can include within them the necessary predetermined block of data which can be used to mark files distributed within the network, and yet, if desired, the same version of the software file can be copied and distributed by conventional techniques without using the invention.

It will be appreciated that the data identifying the copy file could take many forms, e.g. it could be a serial number for that copy file with a central list held elsewhere giving further details of the copy file having each serial number. However, in preferred embodiments of the invention said data identifying said copy file includes one or more items of data identifying the time at which said copy file was made, the authorized user of said copy file, said first data processing system and/or said second data processing system.

Since the block of data to be overwritten may be positioned anywhere within the copy file a problem arises as to how to find the data identifying the copy file once it has been introduced. Accordingly, in preferred embodiments of the invention said data identifying said copy file includes a portion common to differing copy files so as to assist in detection of the location of said data identifying said copy file from within said copy file. A copy file may then be searched for the portion marking the location of the data identifying the copy file when it is desired to recover that data.

A further feature of preferred embodiments of the invention which enhances their security is that the data identifying said copy file is encrypted. This renders less likely the possibility that a person browsing through the copy file would be able to recognize the data identifying the copy file. As a further safeguard against tampering the data identifying the copy file may include a checksum such that when the data identifying the copy file is recovered it can be checked against the checksum to indicated whether it has undergone unauthorized alteration.

Viewed from a second aspect the invention provides a method of identifying a particular copy file produced in accordance with the above characterized by searching said copy file to locate said data identifying said copy file and reading said data identifying said copy file. This is the complementary side to the first aspect of the invention in which data identifying the copy file was written into the copy file. This aspect relates to the reading of that data once it has been inserted.

Viewed from a third aspect the invention provides a master file having a predetermined block of data adapted to be overwritten with data identifying a copy file produced from said master file in accordance with the above.

Viewed from a fourth aspect the invention provides a data processing system for producing a copy file from a master file characterized by means for searching to locate a predetermined block of data within said master file, and means for overwriting said predetermined block of data with data identifying said copy file.

Viewed from a fifth aspect the invention provides a data processing system for identifying a particular copy file produced in accordance with the above characterized by means for searching said copy file to locate said data identifying said copy file, and means for reading said data identifying said copy file.

BRIEF DESCRIPTION OF THE DRAWING

The invention will now be described, with reference to the accompanying drawings in which.

DESCRIPTION OF THE PREFERRED EMBODIMENT

Figure 1:
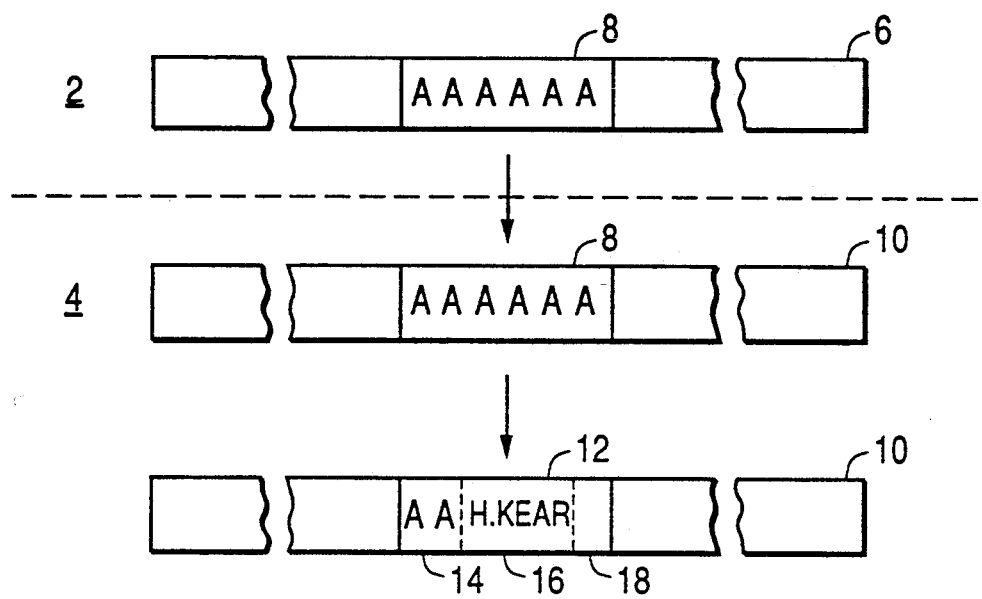
FIG. 1 schematically illustrates the form of the master and copied files.

FIG. 1 shows a master file 6 stored within a first data processing system 2. The master file 6 has embedded somewhere within it a predetermined block of data 8. The block 8 does not play any part in the function of the software of the master file itself; rather its function is to provide a locatable space within the master file in which data identifying a copied file may be written. The block 8 contains a predetermined sequence of code, in this example represented by 'AAAAAA'.

A copy of the master file 6 is then transmitted to a second data processing system 4 which stores it as copied file 10. The block 8 is copied with the rest of the master file 6 and so the copied file 10 also contains a block 8 in the same position as the block 8 within the master file 6.

The second processor 4 then searches through the copied file 10 to locate the block 8. It does this by looking for the occurrence of the sequence 'AAAAAA'. Once the block 8 has been located, it is partially overwritten with the data 12 uniquely identifying the copied file 10. This may comprise the name of the authorized user 16 for that copied file and a checksum 18. A portion 14 of the original sequence is left unaltered. This portion 14 will be common to all copied files, and enables the data in block 8 which identifies the copied file to be located. Alternatively, a new sequence could be written into portion 14 of block 8 for the purpose of enabling the data identifying the copied file to be located.

The unique identifying data 12 could be the userid associated with the second processor 4, or it could be the name of the user supplied to the second processor when it was initialized. The data identifying the copied file 12 may also comprise an identifier for the first processor 12, the second processor 4, and/or the time. Such data is commonly available within data processing networks. The checksum is performed on the data identifying the copied file 12 and the result 18 appended to this data. If the data identifying the copied file 12 is altered, then the checksum will no longer be valid. This may be used to help identify attempts to tamper with the protection mechanism of the invention. The data 12 may also be encrypted in accordance with one of the well-known algorithms such as those discussed in the book 'Security for Computer Networks' by D.W. Davies and W.L. Price, published by Wiley.

Having uniquely identified the copied file 10, it can then be released for use in the second processor 4. Any unauthorized copy made of the copied file 10 will carry with it the identifying data 12 so that the source of the unauthorized copy may be subsequently traced.

The steps involved in this implementation of the invention are:

1. Transmit a copy of a master file from a first processor to a second processor.
2. The second processor searches through the received copied file to locate the predetermined block of data.
3. The second processor overwrites the predetermined block of data with data identifying that copy of the master file.
4. Release the copied file for use by the second processor.

Figure 2:
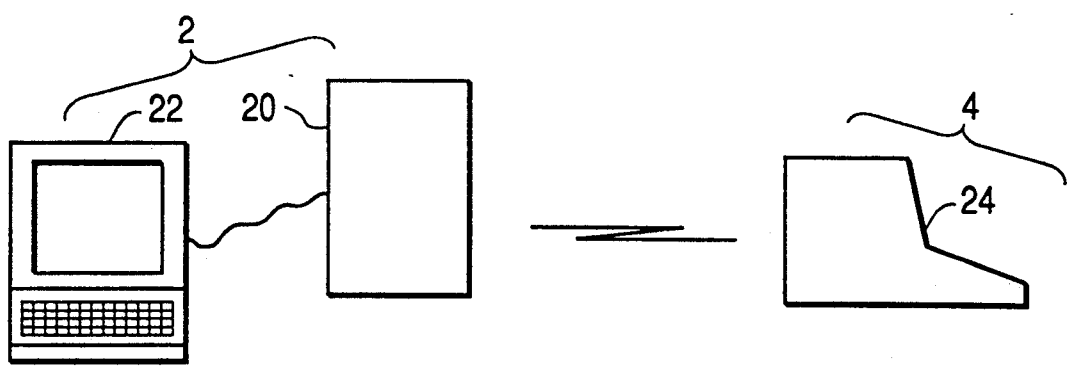
FIG. 2 illustrates a network computer system which may embody the invention.

FIG. 2 illustrates a computer network of the type in which the invention may be implemented. The first processing system 2 includes a mainframe computer 20 with terminals 22, connected over a telecommunications link to a second processing system 4 comprising a workstation 24 such as a personal computer. Software within the host processor 20 and workstation 24 controls the operation of the invention.

The software to implement the invention can be written in any of the well-known computer languages and, having described the function the software, the writing of the software will be a matter of routine to those skilled in the art. It will also be appreciated that while the above has described a software embodiment of the invention, it is theoretically possible to implement any software within hardwired logic and accordingly the marking of computer software files in the manner discussed could be carried out under the control of hardwired logic. Therefore, the invention shall only be limited as specified in the following claims.

I claim:

1. A method of producing a copied file from a master file in a data processing system comprising the steps of:
   copying a master file to produce a copied file,
   searching to locate a predetermined block of data within said copied file, and
   overwriting said predetermined block of data with data identifying said copied file.

2. The method as claimed in claim 1, wherein said data identifying said copied file includes one or more data identifying the time at which said copied file was made and the authorized user of said copied file.

3. The method as claimed in claim 1, wherein said master file is stored on a first data processing system and said copied file is transmitted to a second data processing system.

4. The method as claimed in claim 3, wherein said data identifying said copied file includes one or more data identifying the time at which said copied file was made and the authorized user of said copied file.

5. The method as claimed in claim 3, wherein said data identifying said copied file includes one or more data identifying said first data processing system and data identifying said second data processing system.

6. The method as claimed in claim 5, wherein said data identifying said copied file includes one or more data identifying the time at which said copied file was made and the authorized user of said copied file.

7. The method as claimed in any one of claims 1–6, wherein said data identifying said copy file includes a portion common to differing copy files.

8. A method as claimed in claim 7, wherein said data identifying said copied file includes a checksum of said data identifying said copied file.

9. A method as claimed in claim 7, wherein said data identifying said copied file is encrypted.

10. A method of identifying a copied file comprising the steps of:
providing a block of data containing identifying data in the copied file;
searching the copied file to locate the identifying data; and
reading the identifying data in the copied file.

11. A master file having a predetermined block of data which may be used to identify specific copies of said master file, said predetermined block containing information identifying the master file as the original copy, said predetermined block of data adapted to be overwritten when a copy of said master file is produced, and said overwritten predetermined block of data in said copy identifying that specific copy of said master file.

12. A data processing system for producing a copied file from a master file characterized by means of producing a copied file from a master file, means for searching to locate a predetermined block of data within said master file, and means for overwriting said predetermined block of data with data identifying said copied file.

13. A data processing system for identifying a copied file characterized by means for searching said copied file to locate data identifying the copied file, and means for reading the data identifying said copied file.

* * * * *